United States Patent
Starkey et al.

(10) Patent No.: US 8,821,144 B2
(45) Date of Patent: Sep. 2, 2014

(54) ALIGNMENT INTERLOCK FOR MOLDS AND DIES

(75) Inventors: Glenn Starkey, Wauconda, IL (US); Kenneth Rumore, Wauconda, IL (US)

(73) Assignee: Progressive Components International Corporation, Wauconda, IL (US)

( * ) Notice: Subject to any disclaimer, the term of this patent is extended or adjusted under 35 U.S.C. 154(b) by 0 days.

(21) Appl. No.: 13/112,599

(22) Filed: May 20, 2011

(65) Prior Publication Data
US 2012/0294968 A1    Nov. 22, 2012

(51) Int. Cl.
*B29C 33/20*    (2006.01)
*B29C 45/83*    (2006.01)

(52) U.S. Cl.
USPC ..... 425/107; 425/192 R; 425/595; 425/451.9; 425/472; 425/450.1

(58) Field of Classification Search
CPC ........ B29C 33/20; B29C 33/22; B29C 33/30; B29C 45/83
USPC .......... 425/190, 192 R, 595, 472, 451.9, 161, 425/191, 450.1, DIG. 115, DIG. 223, 107
See application file for complete search history.

(56) References Cited

U.S. PATENT DOCUMENTS

| | | | | |
|---|---|---|---|---|
| 2,846,278 A | * | 8/1958 | Blazek | 384/30 |
| 4,003,283 A | * | 1/1977 | Janiszewski | 83/637 |
| 4,750,876 A | * | 6/1988 | Lawson | 425/406 |
| 5,490,317 A | * | 2/1996 | Kubert | 29/564.7 |
| 6,558,145 B2 | * | 5/2003 | Wieder | 425/107 |
| 6,921,256 B2 | * | 7/2005 | Bokich | 425/190 |
| 6,953,331 B2 | * | 10/2005 | Bokich | 425/192 R |
| 6,981,858 B2 | * | 1/2006 | Wieder | 425/107 |
| 7,229,265 B1 | * | 6/2007 | Lemkin | 425/107 |
| 7,828,542 B2 | * | 11/2010 | Bokich | 425/190 |
| 7,862,326 B2 | * | 1/2011 | Wieder | 425/472 |
| 2004/0043103 A1 | | 3/2004 | Bokich | |
| 2008/0286397 A1 | * | 11/2008 | Wieder | 425/161 |

FOREIGN PATENT DOCUMENTS

| JP | 62-140812 | 6/1987 |
|---|---|---|
| JP | 2001-71053 | 3/2001 |

OTHER PUBLICATIONS

Mold interlocks maintain precise mold alignment, published on Nov. 1, 2007 and by ThomasNet.com, p. 1.*
DME Catalog, "DME Innovative Black & Gold Mold Interlocks, cost effective interchangable wear surfaces," DME Company, Madison Heights, MI,. © 2010, No. BGI-6/1 (7 pages).

\* cited by examiner

Primary Examiner — Dimple Bodawala
(74) Attorney, Agent, or Firm — Pauley Petersen & Erickson

(57) ABSTRACT

An alignment interlock for reciprocating tooling that includes a female lock having a central engagement area and a corresponding male lock having a profile shaped to matingly engage with the central engagement area. A plurality of particle rings are preferably formed on an engagement surface of the profile and an engagement ramp having a polished, radiused lead-in is preferably formed at a leading edge of the profile.

20 Claims, 6 Drawing Sheets

ALIGNMENT INTERLOCK FOR MOLDS AND DIES

BACKGROUND OF THE INVENTION

1. Field of the Invention

This invention relates to a device for maintaining alignment between reciprocating mold halves.

2. Description of Prior Art

Alignment interlocks are used on reciprocating equipment, such as injection molds, to first make contact with opposing sides of the alignment interlock and then engage to lift misaligned mold halves into alignment.

Such alignment interlocks are not limited to injection molds, and may be beneficial in stamping dies, blow molds, die cast dies, etc. Reciprocating equipment and/or machine tools, such as molds for use with injection molding, blow molding, stamping and similar processes involving opposing mold halves generally include at least one and often two machine platens. Conventional molding machines often involve a moving platen and a stationary platen. All molding machine platens sag to varying degrees, with typically the most misalignment present with the movable platen, due to platen bushing wear. Alignment interlocks within the mold are applied to opposing or engaging mold halves or platens to engage and then lift the mold into proper registration. Conventional interlocks have inevitably worn and galled over time, resulting in interlock damage as well as damage to the mold's cavities and cores. Conventional interlock wear begins at the engagement point, and over time the galled surface increases from the point of initial contact to the remaining surface of the interlock.

The initial contact between conventional male and female interlocks has typically been comprised of a fillet radius on the male interlock, and a fillet radius on the female interlock. This fillet radius is always a "full radius", and the typical range is between 1 mm-2 mm, and would not typically exceed this radius size, as that would take away from the remaining amount of straight wear surface present on the interlock. The two interlocks make initial contact at these two fillet radius points, such as shown in FIGS. 6A and 6B. In the case of 0.2 mm sag (or "M" for "misalignment"), there is a mold closing distance (or "LD" for "lifting distance") of 0.8 mm for the interlock on the movable half to be forced up to the straight alignment surface of the stationary half interlock, located at the tangent points of the two radii, as shown in FIGS. 7A and 7B. It is during this travel of the Lifting Distance ("LD") where wear begins.

At other times, a chamfer is present at the male and the female engagement points, with the size and angle typically being at 30 degrees or greater, based from typical chamfers in manufacturing, with a fillet radius typically of 0.3 mm. The angle at which the misaligned movable half interlock resides will vary, typically between 0.1 degrees and 0.3 degrees, and for this reason the two chamfered surfaces do not make flat contact. Instead, the two small fillet radii would be the initial contact, and for 0.08 mm Misalignment, a Lifting Distance would be 0.13 mm, as shown in FIGS. 8 and 9.

The shorter the Lifting Distance is for the Misalignment to be corrected, the higher the amount of destructive impact encountered from the initial contact point until the interlocks reach the position of the fillet radii tangent points. This collision creates the initial material particle disbursement that then will ball up and further generate additional particle disbursement, galling and wear.

SUMMARY OF THE INVENTION

The present invention is directed to an alignment interlock for reciprocating tooling comprising a female lock having a central engagement area and a male lock having a profile shaped to matingly engage with the central engagement area. The male lock preferably includes an engagement ramp formed at a leading edge of the profile and includes a polished, radiused lead-in. In addition, a plurality of particle wells are preferably formed on at least one of an engagement surface of the profile and the central engagement area. The particle wells are preferably annular rings and help prevent balling and similar accumulation of particulate matter between the engaging surfaces of the male and female interlocks. In one embodiment, the particle wells may be arranged in a staggered array along the engagement surface of the male lock.

In addition, the alignment interlock may include an arced relief formed on an exposed surface of the profile of the male lock. Likewise, additional features, as described below may be incorporated into the alignment interlock to improve the durability, efficiency and safety of the device.

The alignment interlock preferably includes a male lock constructed from a different material than the female lock. Specifically, the female lock is preferably formed of US SAE/AISI-D-2 and the male lock is preferably formed of US SAE/AISI H-13. Using this combination, the described alignment interlock is capable of performance cycles that are orders of magnitude greater than conventional mold interlocks. Specifically, the subject alignment interlock is capable of in excess of 300,000 cycles without any noticeable deterioration or degradation of performance where existing locks typically see cycles to failure in the 20,000-80,000 range. This performance is critical when the continued and reliable operation of expensive machine tools is at stake.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

The invention is an improvement over current alignment interlocks for injection molds. FIGS. 1-5 show various preferred embodiments of an alignment interlock 10 that comprises an improved profile form for where opposing halves of mating interlocks first make contact and then engage to lift misaligned mold halves into alignment. A grease retention detail, such as a particle well 90, is preferably provided for lubrication retention and for capturing wear particulate as the subsequent straight surfaces slide further together as the mold closes. In particular, as described in the specification and claims, preferred combinations include an engagement ramp 85 and particle wells 90. In addition, specific materials for the alignment interlock 10 have been improved.

Figure 1:
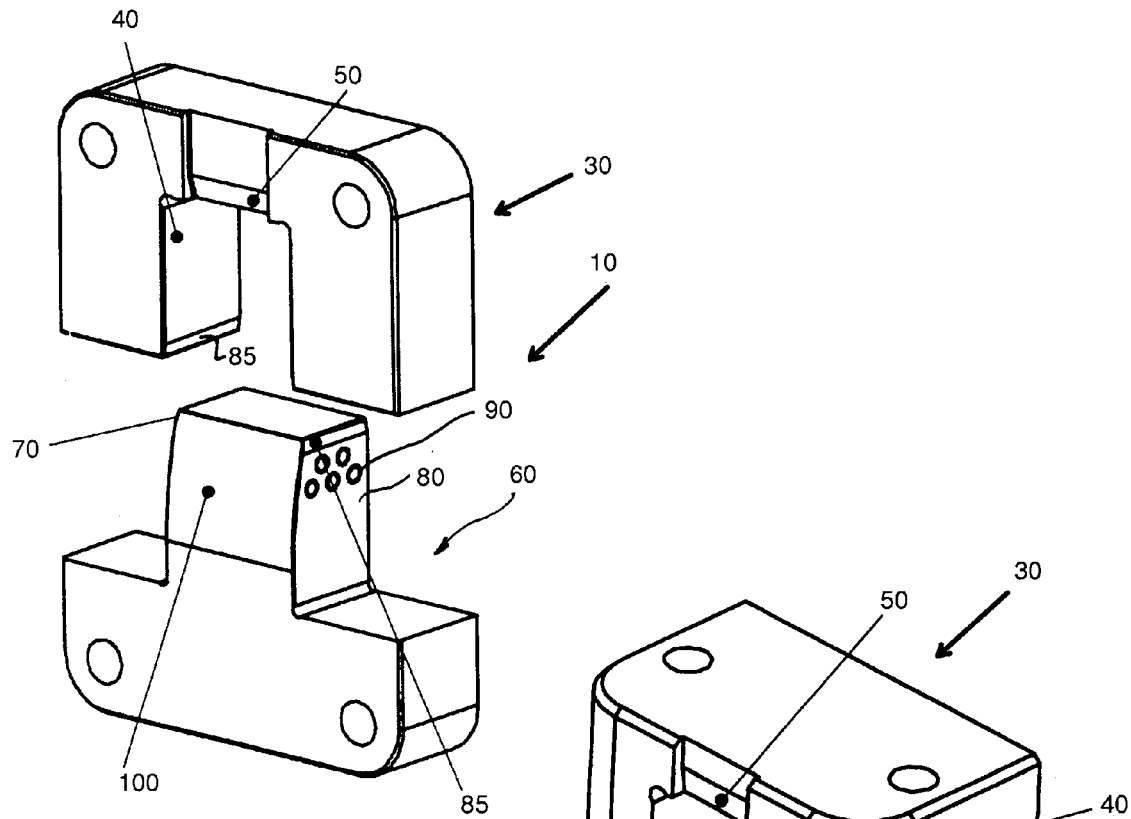
FIG. 1 shows a front perspective view of an alignment interlock according to one embodiment of this invention.

In particular, FIGS. 1-5 show an alignment interlock 10 that includes a female lock 30 having a central engagement area 40 and a male lock 60 having a profile 70 shaped to matingly engage with the central engagement area 40. In this manner, the male lock 60 and the female lock 30 may be attached to corresponding opposite platens to effect alignment of the tooling. As shown in FIG. 1, an elongated engagement area between the male lock 60 and the female lock 30 advances previously-established industry standards, thereby resulting in a more durable alignment interlock 10.

Figure 10:
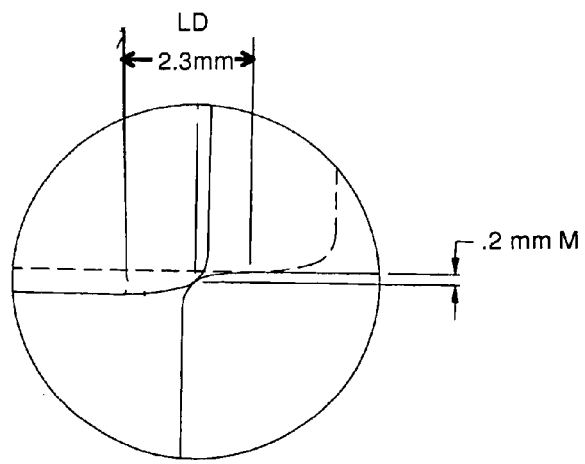
FIG. 10 shows a schematic of the interaction between two radiused surfaces of two contact points according to one embodiment of this invention.

According to a preferred embodiment, features are provided to defend against the initial wear point condition. An engagement ramp 85 is preferably formed at a leading edge of the profile 70 and preferably includes a polished, radiused lead-in. Likewise, a corresponding engagement ramp 85 is preferably formed at a mating edge of the central engagement area 40 of the female lock 30. A radial engagement ramp 85 as shown and described preferably provides a longer Lifting Distance, resulting in lowered amount of destructive impact to be encountered during the initial engagement travel. The radial surface according to the subject invention is preferably comprised of a large partial radius versus a smaller, full fillet radius. Rather than a 1-2 mm full radius, this design is comprised of a 6-12 mm partial radius. This larger radius is preferably formed over a short distance so as to not take away surface area from the subsequent alignment surfaces. In the case of 0.2 mm Misalignment, there is a Lifting Distance of 2.3 mm for the interlock on the movable half to lift up to the straight alignment surface of the stationary half interlock, located at the tangent points of the two radii, as shown in FIG. 10. This gradual sloping travel results in lower destructive impact than previous methods, and lower destructive impact results in less particle disbursement, and ultimately less galling and wear.

Rather than forming fillet radii by machining in a milling machine with an end mill, which results in a rough milled surface, this radial engagement ramp 85 is preferably a ground surface, polished smoother than milled surfaces. This large sloping surface, combined with a polished transition radius, reduces the impact friction and pressure when lifting the movable mold half. The polished, radiused lead-in of the engagement ramp 85 as described preferably results in smooth lifting upon engagement of the mold halves.

Figures 4, 5:
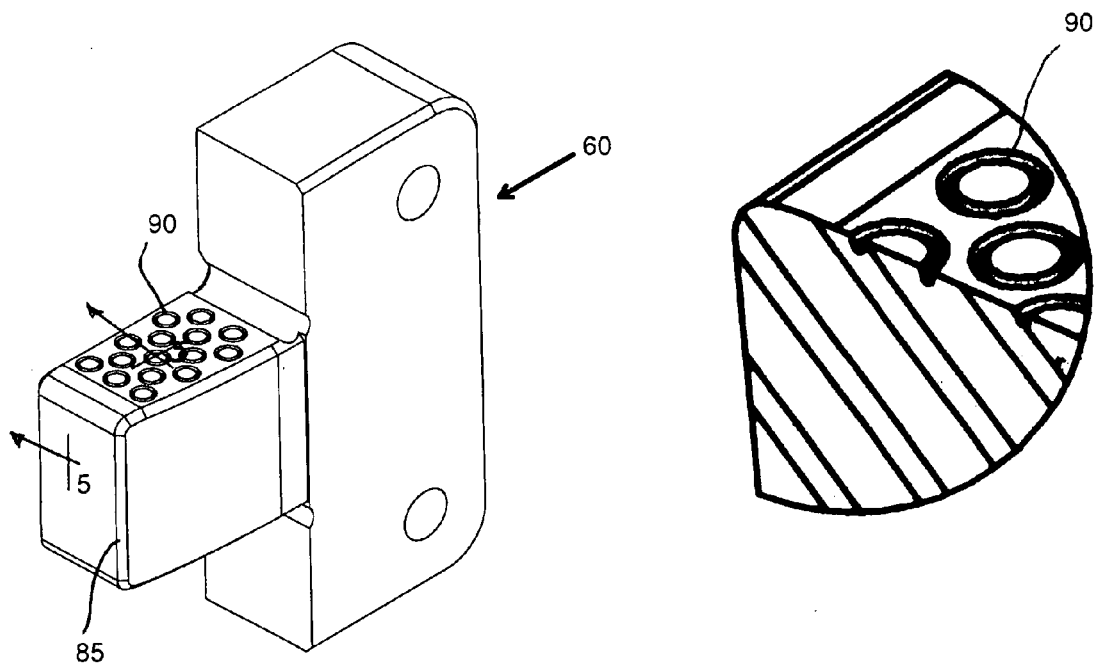
FIG. 4 shows a bottom perspective view of a male portion of an alignment interlock according to one embodiment of this invention.
FIG. 5 shows a magnified cross-sectional view of a portion of the male portion of the alignment interlock shown in FIG. 4.
Figure 6A:
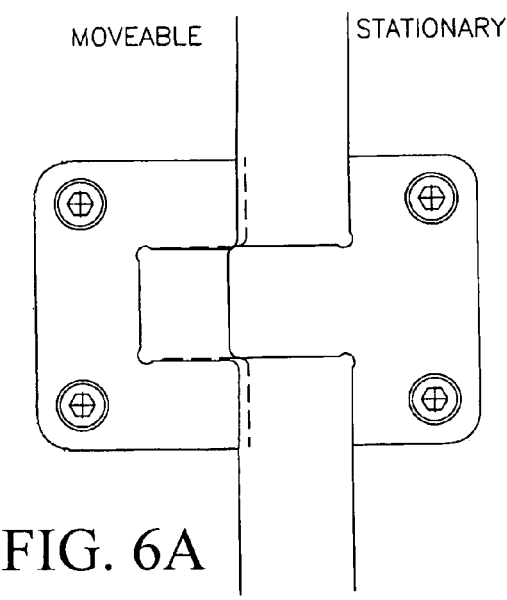
FIG. 6A shows a side schematic view of an operation of an alignment interlock according to the prior art.
Figure 7A:
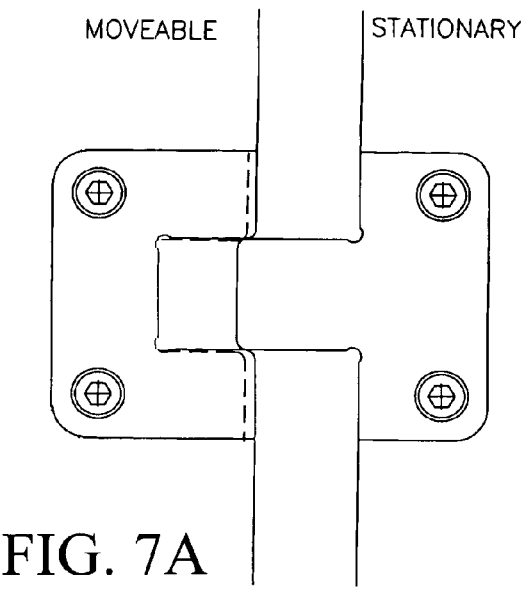
FIG. 7A shows a side schematic view of an operation of an alignment interlock according to the prior art.
Figure 6B:
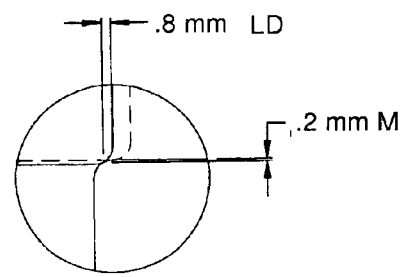
FIG. 6B shows a magnification of two fillet radius points during the operation shown in FIG. 6A.
Figure 7B:
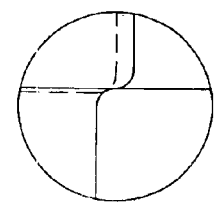
FIG. 7B shows a magnification of two fillet radius points during the operation shown in FIG. 7A.
Figure 8:
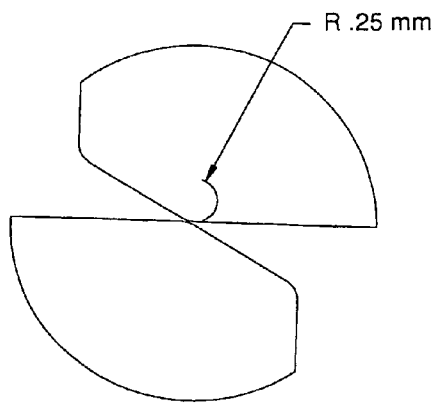
FIG. 8 shows a schematic of the interaction between two chamfered surfaces of two fillet radius contact points according to the prior art.
Figure 9:
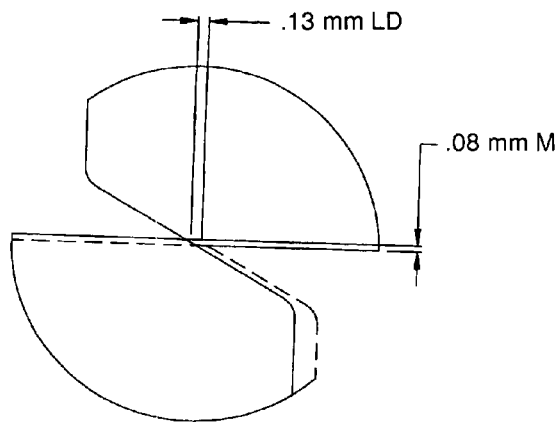
FIG. 9 shows a schematic of the interaction between two chamfered surfaces of two fillet radius contact points according to the prior art.

The straight surfaces between the engaging male lock 60 and female lock 30 are referred to as engagement surface 80 and central engagement area 40, respectively. According to a preferred embodiment, a plurality of particle wells or rings 90 are formed on an engagement surface 80 of the profile 70. These particle wells 90 have two purposes. First, in the event that there has been any pick-up or galling despite the radial engagement ramp friction reduction, any particles that have been microscopically generated off of the base material, have a recess for depositing, rather than 'balling up' along the surface and picking up and growing to further continue wear and galling. Secondly, the particle wells 90 can retain lubrication in order to migrate to the remainder of the lock's surface. As best shown in FIG. 5, the particle rings 90 are preferably annular. However, the particle wells 90 may be a "figure eight" configuration or other desirably smooth configuration to promote expulsion of accumulated particles from the engagement surface 80. A preferred well design is as a 'ring', so that reduction of bearing surface is minimal yet the wells are throughout the alignment surface, as shown in FIG. 4. Existing alignment locks may include surface features such as dimples or channels that take from the away the surface area, as well as potentially including large amounts of grease that could buildup, an objectionable condition when molding for the medical or packaging markets.

As described, particle rings 90 are preferably arranged on and/or across a width of the male locks 60 to capture material and debris to remove it to avoid "picking up" or galling the alignment surface. Alternatively, or in addition, particle rings 90 may be arranged along the central engagement area 40 of the female lock 30. As shown in FIGS. 1-4, the particle rings 90 may be arranged in a staggered array. Further, the staggered array is preferably, though not necessarily, formed on each engagement surface 80 of the male lock 60. In addition, the staggered array is preferably, though not necessarily, formed along a leading edge of each engagement surface 80 of the profile, as shown in FIG. 1.

Figure 11:
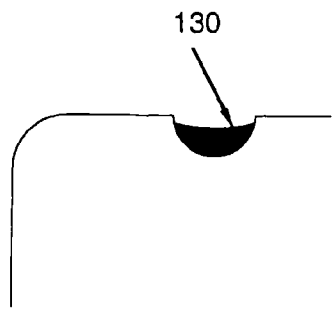
FIG. 11 shows a side cross-sectional schematic view of a grease depression or channel according to the prior art.

When a conventional grease channel width is of a larger proportion as compared to the depth, much of the grease 130 is exposed to air, leading to a drying and contraction of the grease 130, and the level of the grease 130 decreases, thus not providing surface lubrication, such as shown in FIG. 11.

Mold builders generally prefer to purchase mass produced standard interlocks, versus producing interlocks for their molds on a per mold basis, due to economies of scale. Some standard or conventional interlocks have grease dimples or channels, but most do not. Some interlocks arrive to the moldmaker sealed in a bag with an oil intended to prevent corrosion when inventoried, while some are shipped dry. Regardless, in practice, the mold builder generally wipes down any oil present, and applies grease before delivering the mold to the molder.

Figure 12:
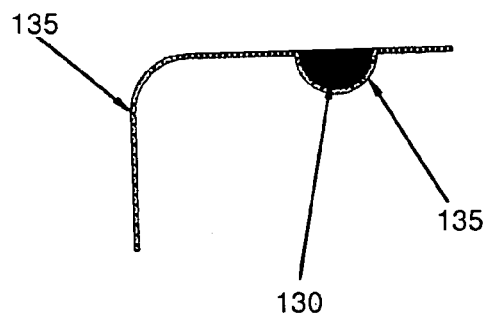
FIG. 12 shows a side cross-sectional schematic view of a grease depression or channel according to the prior art.

This practice can produce an unfavorable condition for the molder, if interlocks with grease channels or dimples machined by the mass production manufacturer, were to be shipped with oil 135 for corrosion resistance. The oil 135 in the channels would not be consistently cleaned by moldmakers, and the lubrication grease 130 applied rests on an oily film within the grease channel or dimple, such as shown in FIG. 12. This results in poor grease adhesion, with the surface grease 130 displaced over the time of mold cycling, and the surface becomes dry and prone to wear.

Figure 13:
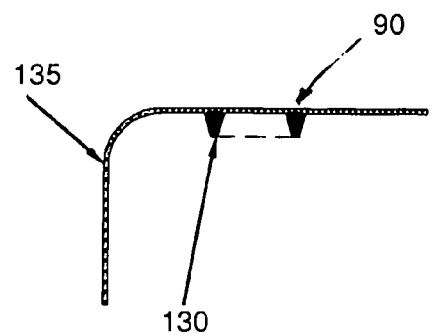
FIG. 13 shows a side cross-sectional schematic view of a particle ring according to one embodiment of this invention.
Figure 14:
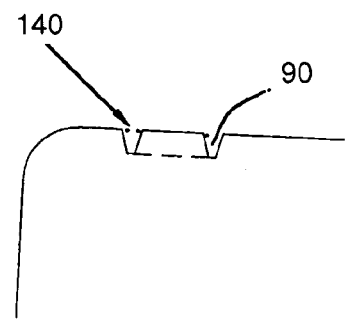
FIG. 14 shows a side cross-sectional schematic view of a particle ring according to one embodiment of this invention.

With the improved particle well design, the improved interlock can be supplied in such a way that the end user of the interlock, the molder, can receive consistently lubricated and therefore consistently performing interlocks, from their various suppliers of injection molds. FIGS. 13 and 14 show a representative cross section of a single particle well 90.

The improved method of lubrication begins with a low viscosity grease 130 or paste being applied, or even considered 'packed', into the particle rings 90 that are otherwise free from oil or other contaminants which would reduce adhesion. Then, a compatible corrosion resistant light weight oil 135 is preferably applied in order to prevent corrosion. Alternatively, an Anox paper can be provided within the sealed bag, or the use of carrion resistant treatments to the interlock could allow the shipping of the lock to be free from protecting oils. Alternatively, a film or material may be adhered to the surfaces of the alignment interlock, such as the engagement surface 80, following the desired lubrication and such film may be removed by the moldmaker immediately prior to installation. Regardless, the alignment interlock 10 preferably arrives to the moldmaker pre-packed with grease that is of a viscosity that will be retained within the particle rings, such as shown in FIG. 13.

When the improved alignment interlock 10 is in service, any particulate matter that might be generated from the impact of engagement, travels into the particle ring 90 where it can no longer drag along the surface creating further material disbursement and wear. Further, grease is displaced out of the particle ring 90 by any particulate matter 140 that enters and builds within the particle ring 90. As a result, an alignment interlock 10 that at the entry point encounters wear, subsequently circulates lubrication as a result, as shown in FIG. 14.

Figure 15:
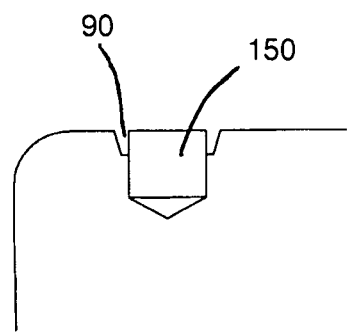
FIG. 15 shows a side cross-sectional schematic view of a particle ring formed with a plug inserted into a drilled hole according to one embodiment of this invention.

A variation of the above can occur with lubricious plugs 150 inserted into drilled holes, with the holes having a minute amount of space to collect and subsequently force the plug to protrude and provide lubrication, such as shown in FIG. 15.

While the engagement ramp 85 and the particle wells 90 preferably reduce creation and dispersion of stray metal particulate 150 that later balls up to scuff and gall the engaging surface, the base material for the male interlock 60 and the female interlock 30 are important to the performance of the alignment interlock. Following extensive analysis and development, the following combination performed exceptionally:

Female Interlock
Material: US SAE/AISI-D-2 (Japan—SKD11, Germany W.nbr—1.2379)
  Hardness: 58-62 Rc.
  Treatment: Titanium Nitride (High temperature, preferred)
Male Interlock
Material: US SAE/AISI-H-13 (Japan SKD 61, Germany W.nbr—1.2344))
  Hardness: Through harden and temper, Melonite QPQ (Ferritic Nitrocarburizing with polish), minimum surface hardness 940 HV1.0 (for minimum depth of 0.005"), core hardness 42-48 Rc.

Figure 2:
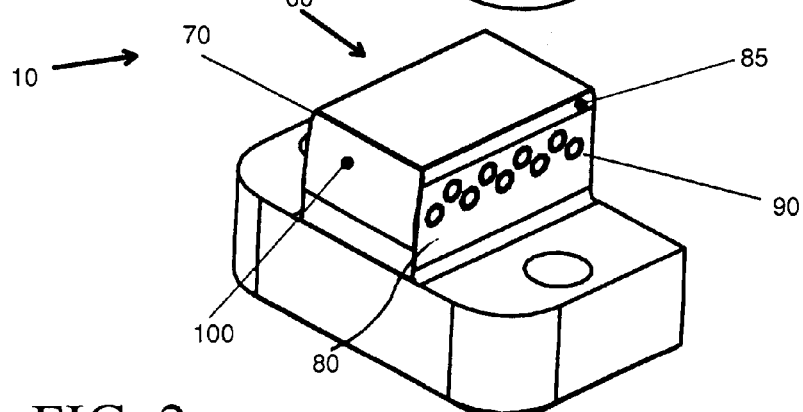
FIG. 2 shows a front perspective view of an alignment interlock according to one embodiment of this invention.
Figure 3:
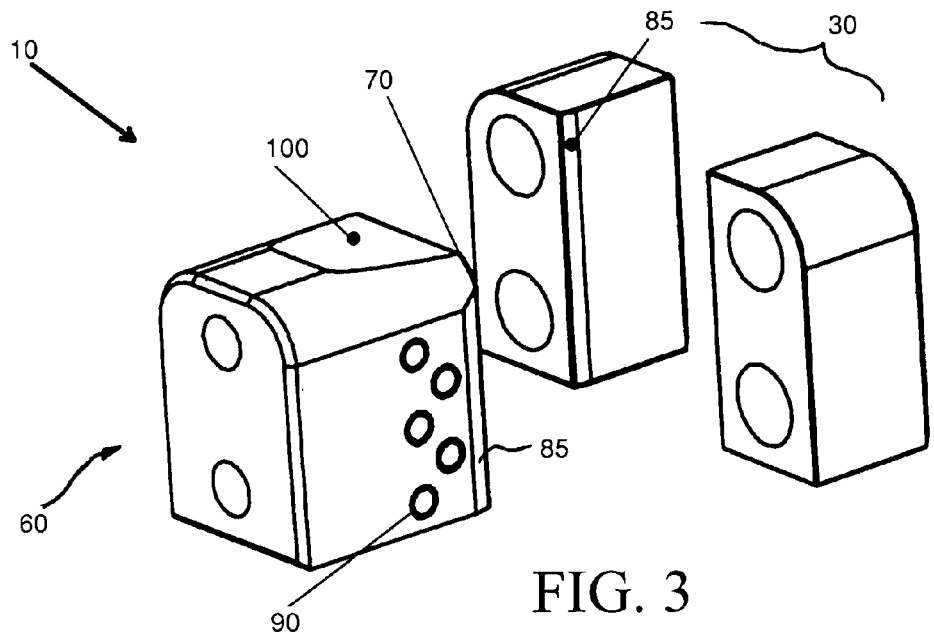
FIG. 3 shows a front perspective view of an alignment interlock according to one embodiment of this invention.

Occasionally a molded part, upon ejection, drops onto the surface of the male interlock 60 that is generally mounted on the bottom of the mold. The result can be upon mold closing, a smashed part and damaged moldbase. To prevent this, a radial arced relief 100 is preferably provided on an inner portion of the male interlock 60, such as shown in FIGS. 1-3, for the molded part to deflect off of rather than reside upon that surface.

Previously, moldmakers would add an angled relief to a standard purchased male interlock, at added expense to them, and meanwhile decrease the amount of the working alignment surface. Also, machining away part of a previously heat treated component creates an interruption of the treatment, of which chipping and flaking can originate from.

An angled surface could still allow molded parts to reside on that ledge, creating a collision condition. Machining a radial relief to a finished, hardened part would be costly and objectionable to the moldmaker, however as a feature of a standard component, that surface can easily be machined within the production process prior to heat treatment hardening. Also, an arced relief removes considerably less working surface than of an angled relief.

In addition, the alignment interlock 10 preferably includes several additional features that result in a safer, more predictable operation. Specifically, the alignment interlock 10 preferably includes rounded edges on protruding surfaces. As a result of a larger radius on protruding surfaces, operator "reach in" injury is reduced or eliminated. Further, a chamfer 50 is preferably positioned at a terminal edge of the central engagement area 40. This chamfer 50 provides a useful pry slot lead-in to expand the entry to accommodate a pry bar to ease removal of the alignment interlock 10.

While in the foregoing specification this invention has been described in relation to certain preferred embodiments thereof, and many details have been set forth for purposes of illustration, it will be apparent to those skilled in the art that the apparatus is susceptible to additional embodiments and that certain of the details described herein can be varied considerably without departing from the basic principles of the invention. For instance, the design of the radial engagement ramp, particle rings, and materials, can be utilized in other wear components within a mold, such as slides, wear plates, lifters, gear rack guides, etc.

The invention claimed is:

1. An alignment interlock for reciprocating tooling comprising:
    a female lock having a central engagement area;
    a male lock having a profile shaped to matingly engage with the central engagement area;
    a plurality of particle rings formed on an engagement surface of the profile across a width of the male lock, wherein each of the plurality of particle rings comprise an annular recess encircling a corresponding portion of the engagement surface.

2. The alignment interlock of claim 1 further comprising:
    an engagement ramp formed at a leading edge of the profile, the engagement ramp having a polished, radiused lead-in.

3. The alignment interlock of claim 1 further comprising:
    an arced relief formed on an exposed surface of the profile of the male lock.

4. The alignment interlock of claim 1 further comprising:
    a chamfer positioned at a terminal edge of the central engagement area.

5. The alignment interlock of claim 1 wherein the particle rings are arranged in a staggered array.

6. The alignment interlock of claim 5 wherein the staggered array is formed on each engagement surface of the male lock.

7. The alignment interlock of claim 5 wherein the staggered array is formed along a leading edge of each engagement surface of the profile.

8. The alignment interlock of claim 1 wherein the male lock is formed of a different material than the female lock.

9. The alignment interlock of claim 1 wherein the male lock is formed of hardened tool steel with a surface treatment.

10. The alignment interlock of claim 1 wherein the female lock is formed of hardened tool steel with a surface treatment.

11. An alignment interlock for reciprocating tooling comprising:
   a female lock having a central engagement area;
   a male lock having a profile shaped to matingly engage with the central engagement area;
   an engagement ramp formed at a leading edge of the profile, the engagement ramp having a polished, radiused lead-in; and
   a row of a plurality of spaced apart particle wells formed on and extending across a width of at least one of an engagement surface of the profile or the central engagement area, wherein each of the plurality of particle wells comprises an annular recess encircling a corresponding portion of the engagement surface or the central engagement area.

12. The alignment interlock of claim 11 wherein the particle wells are arrangement in a staggered array.

13. The alignment interlock of claim 11 further comprising:
   an arced relief formed on an exposed surface of the profile of the male lock.

14. An alignment interlock for reciprocating tooling comprising:
   a female lock having a central engagement area; and
   a male lock having a profile shaped to matingly engage with the central engagement area; and
   a plurality of particle wells formed on at least one of an engagement surface of the profile or the central engagement area, wherein each of the plurality of particle wells comprises an annular recess encircling a corresponding portion of the engagement surface or the central engagement area.

15. The alignment interlock of claim 14 further comprising:
   an engagement ramp formed at a leading edge of the profile, the engagement ramp having a polished, radiused lead-in.

16. The alignment interlock of claim 1 further comprising:
   a first row including more than one of the plurality of particle rings extending across the width of the male lock; and
   a second row of more than one of the plurality of particle rings extending across the width of the male lock, wherein the particle rings of the second row are staggered with respect to the particle rings of the first row.

17. The alignment interlock of claim 1 wherein the corresponding portion of the engagement surface comprises a lubricious plug.

18. The alignment interlock of claim 11 further comprising a second row of a second plurality of spaced apart particle wells formed on and extending across at least one of an engagement surface of the profile or the central engagement area, wherein each of the second plurality of particle wells comprises an annular recess.

19. The alignment interlock of claim 14 further comprising:
   a first row including more than one of the plurality of particle wells extending across the width of the engagement surface of the profile or the central engagement area; and
   a second row of more than one of the plurality of particle wells extending across the width of the engagement surface of the profile or the central engagement area, wherein the particle wells of the second row are staggered with respect to the particle wells of the first row.

20. The alignment interlock of claim 11 wherein the male lock is formed of hardened tool steel with a surface treatment and the female lock is formed of hardened tool steel with a titanium nitride surface treatment.

* * * * *